United States Patent [19]

Matthews

[11] 4,050,517
[45] Sept. 27, 1977

[54] GEOTHERMAL ENERGY WELL CASING SEAL AND METHOD OF INSTALLATION

[75] Inventor: Hugh B. Matthews, Boylston, Mass.

[73] Assignee: Sperry Rand Corporation, New York, N.Y.

[21] Appl. No.: 732,262

[22] Filed: Oct. 14, 1976

[51] Int. Cl.² ............... E21B 33/126; E21B 43/00; F01K 23/00; F03G 7/04
[52] U.S. Cl. ................... 166/315; 60/641; 165/45; 166/106; 166/202
[58] Field of Search ............ 166/315, 314, 202, 181, 166/106, 105, 101, 68, 57, 302; 60/641, 655; 165/45

[56] References Cited

U.S. PATENT DOCUMENTS

| | | | |
|---|---|---|---|
| 2,739,653 | 3/1956 | Haines | 166/202 X |
| 2,929,455 | 3/1960 | Godbey | 166/202 X |
| 3,053,321 | 9/1962 | Ortloff | 166/202 X |
| 3,431,974 | 3/1969 | Buck | 166/202 X |
| 3,734,179 | 5/1973 | Smedley | 166/106 |
| 3,824,793 | 7/1974 | Matthews | 60/641 |
| 3,891,031 | 6/1975 | Ortiz | 166/106 X |
| 3,967,448 | 7/1976 | Matthews | 60/641 |
| 3,988,896 | 11/1976 | Matthews | 60/641 |

Primary Examiner—Stephen J. Novosad
Attorney, Agent, or Firm—Howard P. Terry

[57] ABSTRACT

A geothermal energy transfer and utilization system makes use of thermal energy stored in hot solute-bearing well water to generate a thermal working fluid from an injected flow of clean fluid. The working fluid is then used for operating a turbine-driven pump near the well bottom for pumping the hot solute-bearing water in liquid state to the earth's surface, where it is used by transfer of its heat content to a closed-loop generator-turbine alternator combination for the beneficial generation of electrical power. The deep well pump system is supported within the well casing pipe from the earth's surface by a turbine exhaust conduit. In view of the effects of differential expansion on the relative lengths of the well casing pipe and the exhaust conduit, a novel flexible seal is provided between the suspended turbine-pump system and the well casing. Furthermore, an arrangement is provided for protecting elements of the flexible seal during initial lowering of the deep well pump and its associated seal system into the well and then for automatically deploying the seals in their operating condition at the well bottom.

10 Claims, 8 Drawing Figures

GEOTHERMAL ENERGY WELL CASING SEAL AND METHOD OF INSTALLATION

BACKGROUND OF THE INVENTION

1. Field of the Invention

The invention relates generally to efficient means for the generation of electrical power utilizing energy from geothermal sources and, more particularly, relates to arrangements for suspending and sealing in operating relation hot geothermal water pumping equipment in deep, hot water wells for the transfer of thermal energy to the earth's surface.

2. Description of the Prior Art

A prior art advance in the art of extraction and use of geothermal energy is reflected in the H. B. Matthews U.S. Pat. No. 3,824,793 for a "Geothermal Energy System and Method," issued July 23, 1974 and assigned to Sperry Rand Corporation. This prior Matthews invention provides means for efficient power generation employing energy derived from geothermal sources through the generation of dry, super-heated steam and the consequent operation of sub-surface equipment for pumping extremely hot well water at high pressure upward to the earth's surface. Clean water is injected at a surface station into the deep well where thermal energy stored in hot solute-bearing deep well water is used at a deep well station to generate super-heated steam from the clean water. The resultant dry, super-heated steam is used at the well bottom for operating a turbine-driven pump for pumping the hot solute-bearing well water to the earth's surface, the water being pumped at all times in the system at a pressure sufficient to prevent flash steam formation. The highly energetic water is used at the surface power station in a binary fluid system so that its thermal energy is transferred to a closed-loop surface-located vapor generator-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

In the H. B. Matthews U.S. Pat. No. 3,967,448 for a "Geothermal Well Casing Seal," issued July 6, 1976 and also assigned to Sperry Rand Corporation, there is described an improvement facilitating ready installation and reliable operation of such geothermal systems; according to that invention, there are provided means for the support of the deep well geothermal pump system within the well casing from the earth's surface by the pump-driven turbine exhaust steam conduit. In view of the differential expansion effects on the relative lengths of the casing extending downward from the earth's surface and the exhaust steam conduit contained therein, a particular flexible seal arrangement was provided between the suspended geothermal pump system and the well pipe casing. A first element of the improvement provided a vertical, smooth cylindrical sealing surface at the desired location for the deep well apparatus by means itself previously sealed to the well casing pipe. A second element assured easy assembly of a second seal interfacing the cylindrical sealing surface and suspended from the hot water pump so as to permit sliding motion of the seal in the prevailing hostile environment.

It is necessary to provide an efficient seal of some kind between the brine pump and the well casing; otherwise, a differential pressure would never be built up across the brine pump impeller. While the seal of the prior Matthews patent has certain established advantages for this purpose, it is complex and expensive. This expensive design will seal against very high differential pressures and is effectively leak-proof, while some leakage may actually be permitted. The packer used in the prior arrangement requires a large-diameter casing, whereas casings of more conventional dimensions are less expensive and evidently preferred. The prior art fixed packer is relatively expensive to buy and to insert, adding considerably to the time required for deployment of the equipment in the geothermal well. The fixed packer must be drilled out when it is to be removed.

SUMMARY OF THE INVENTION

The invention is an improvement facilitating ready installation and reliable operation of geothermal systems, including geothermal energy retrieval systems of the kind described in the aforementioned H. B. Matthews U.S. Pat. No. 3,824,793. The invention affords ready and less expensive installation of deep well geothermal apparatus. The deep well apparatus is supported within the well casing pipe from the well head at the earth's surface by the pump-driving turbine exhaust conduit. Alternatively, the working fluid conduit may serve as the suspension. Differential expansion effects are accommodated by a novel sealing arrangement mounted on the geothermal pump itself before it is lowered into the well and having seal interfaces directly mating with the interior surface of the well casing when deployed at the well bottom. An arrangement is provided for protecting elements of the flexible seal during lowering of the pump and its associated seal system into the well and then for automatically deploying the seals in their operating condition.

DESCRIPTION OF THE PREFERRED EMBODIMENTS

Figure 1:
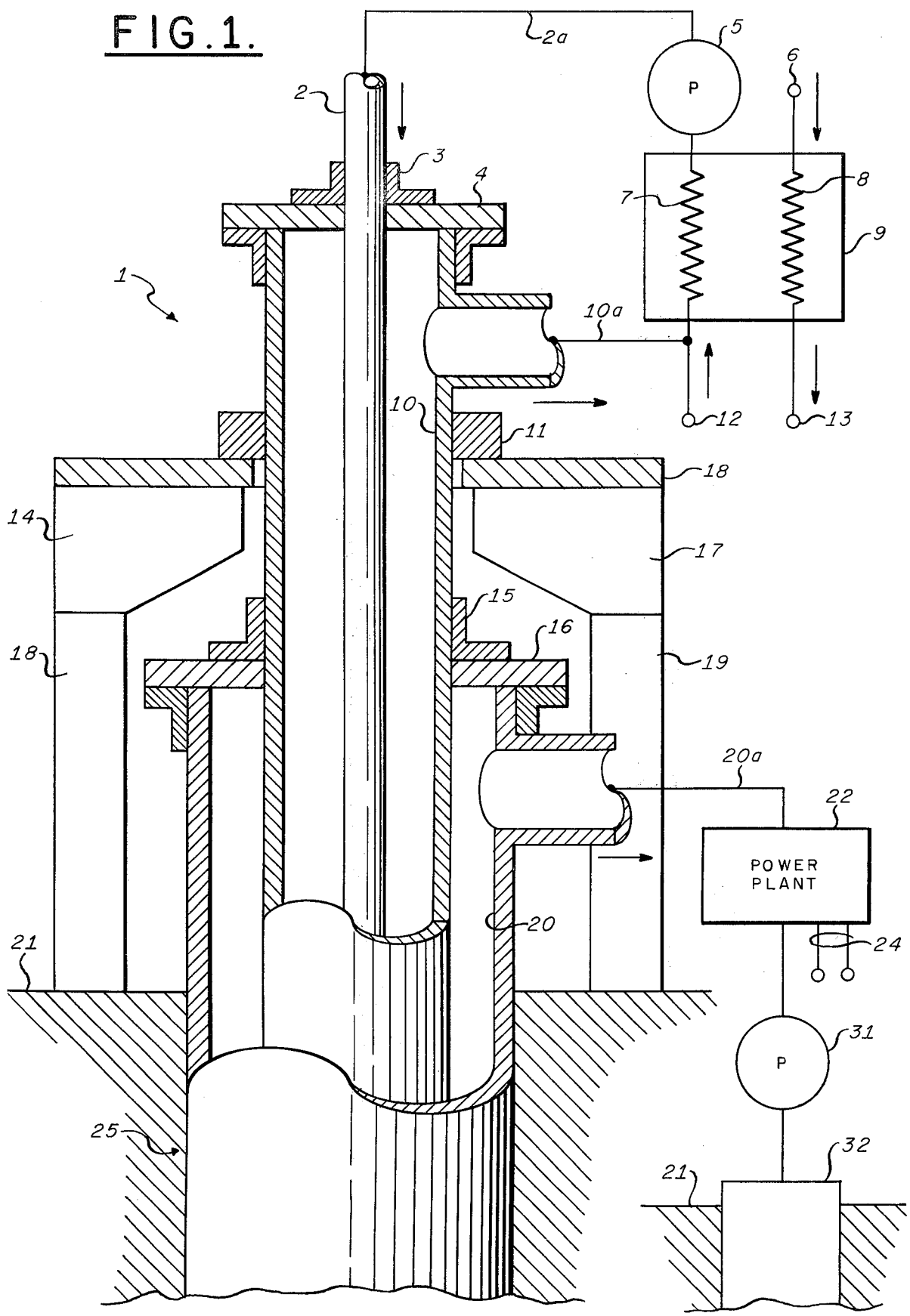
FIG. 1 is an elevation view, mostly in cross section, of the suspension arrangement for the deep well geothermal pumping apparatus.
Figure 2:
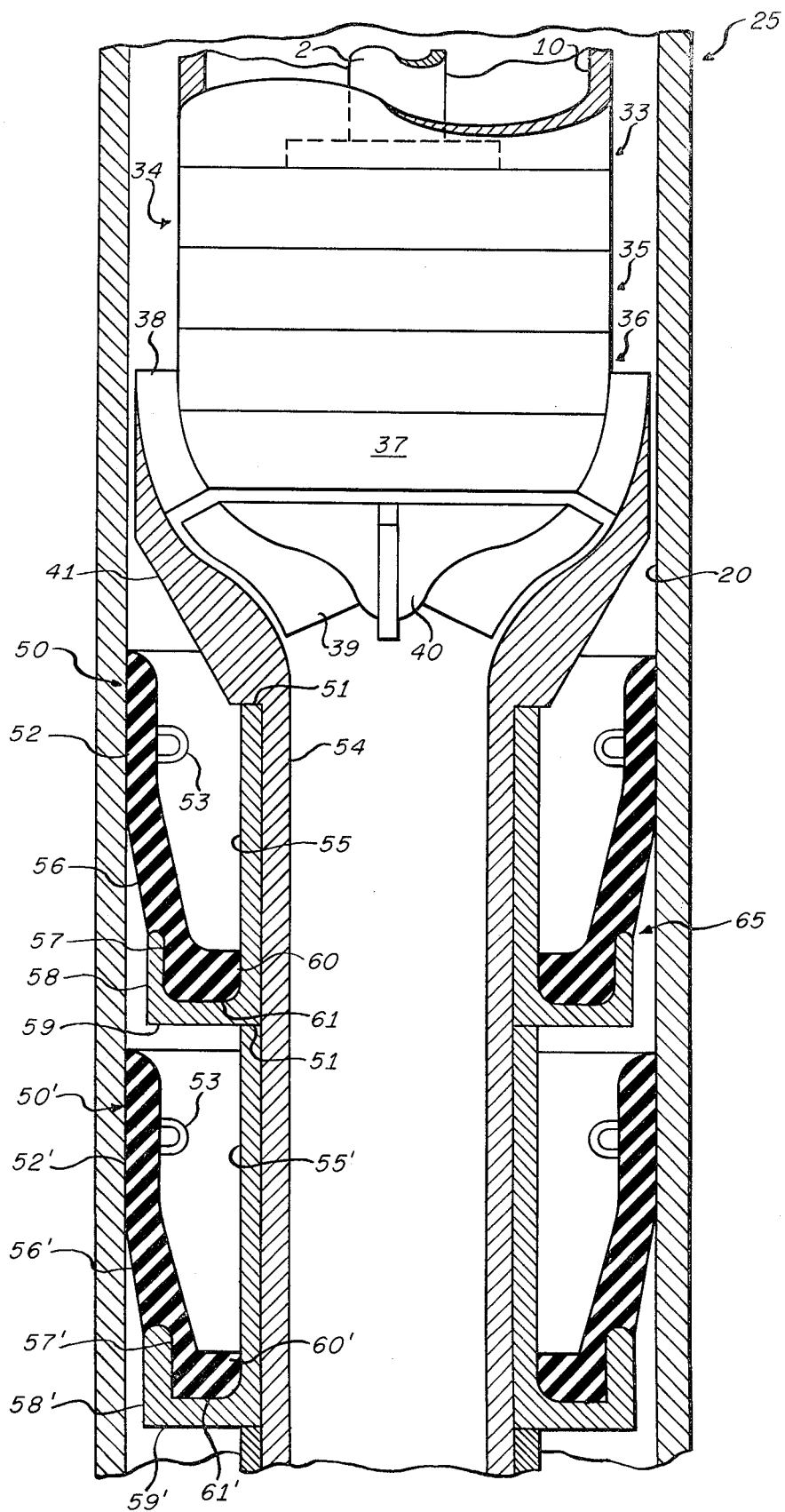
FIG. 2 is an elevation view, mostly in cross section, of the deep well geothermal pump apparatus and of the novel sealing arrangement.

FIGS. 1 and 2 illustrate the general structure and characteristics of a geothermal energy extraction system a portion of which is immersed in a deep well extending into strata below the surface of the earth, preferably being located at a depth where a copious supply of extremely hot water is naturally available, the active pumping structure being located adjacent the hot water source and within a generally conventional well casing pipe 20. The configuration in FIG. 1 is seen to include a well head section 1 located above the earth's surface 21 and a main well section 25 extending downward from well head section 1 below the earth's surface 21. In a geothermal system such as that illustrated in the aforementioned Matthews U.S. Pat. No. 3,824,793, for example, the main well section 25 joins a steam or other vapor generator input section 33 near the source of hot, geothermal brine. As is explained in the Matthews patent, the steam generator section 34, the steam turbine section 35, a rotary bearing section 36, and a hot water pumping section 37 follow in close cooperative succession at increasing depths. At the lowest or seal section 65, the input to the pump section 37 is sealed with respect to the inner wall of well casing pipe 20, as will be further described.

Referring again particularly to FIG. 1, the well casing pipe 20 extends downward from the well head section 1 in preferably concentric relation about an innermost conduit 2 for supplying a flow of relatively cool pure water at the bottom of the well. A second relatively large conduit 10 surrounding conduit 2 is also provided within well casing 20, extending from well head 1 to the energy conversion and hot water pumping system at the bottom of the well and permitting turbine exhaust steam to flow to the surface of the earth.

The clean water injection pipe 2 passes through a fitting 3 mounted on the apertured capping plate 4. In a similar manner, the exhaust steam return pipe 10 passes through a fitting 15 mounted on a second apertured capping plate 16. While these generally concentric structures may be integrated to a degree, it is intended that the exhaust steam pipe 10 furnish the main support for the deep well apparatus, though conduit 2 may be used alternatively. For this purpose, a ring collar 11 is affixed about the exhaust steam pipe 10 immediately below its tee branch 10a. Ring collar 11 normally rests on a suitable horizontal platform 18 which may, in turn, be supported by braces 14, 17 from associated vertical support beams 18 and 19. The latter are fixed in the earth, for example, by suitable concrete foundation elements (not shown) that may take entirely conventional form. In this manner, the weight of the conduits within the well casing pipe 20 and the weight of the deep well geothermal pump apparatus itself are primarily suspended from the exhaust steam return pipe 10 by platform 18.

It will be seen from FIGS. 1 and 2 that relatively clean cool water is pumped by pump 5 through pipe 2a into the vertical injection pipe 2 down to the pressure regulator and input section 33 (FIG. 2). As in the aforementioned Matthews U.S. Pat. No. 3,824,793, the water flow in pipe 2 is then divided for further downward flow in two branching pipes (not shown). A first branch path supplies the clean water for lubricating a system of bearings within the bearing section 36. The second branch path feeds clean water through a pressure regulator in the steam generator input section 33 and via other distribution pipes to an input manifold of the steam generator in section 34. Accordingly, high pressure steam is delivered to a steam turbine located within turbine section 35.

The function of the turbine located at section 35 and supported on bearings located within bearing section 36 is to drive a hot water pump located at section 37. Hot well water is thus impelled a high pressure upward by the rotating pump blades 39 between the rotating conical end 40 of the pump and an associated stationary shroud 41; the hot water is pumped upward at high velocity in the annular conduit between pipes 10 and 20, thus permitting use of the thermal energy it contains at the earth's surface. More important, the hot water is pumped upward to the earth's surface 21 at a pressure preventing it from flashing into steam and thus undesirably depositing dissolved salts at any point of flashing.

Accordingly, it is seen that the extremely hot, high-pressure well water is pumped upward, flowing in the annular region defined between pipes 10 and 20. Heat supplied by the hot well water readily converts the clean water flowing into the steam generator section 34 into highly energetic, dry, super-heated steam. The clean water, before flowing into the pressure regulator of input section 33, is at a very high pressure due to its hydrostatic head and also because of the action of the surface-located pressure pump 5 so that it may not flash into steam. The pressure regulator at location 33 controls the pressure of the clean water flowing therethrough so that it may be vaporized and superheated in the steam generator in section 34. The highly energetic steam drives the steam turbine at section 34 and is then redirected to flow upward to the earth's surface 21 after expansion as relatively cool steam flowing within the annular conduit defined between pipes 2 and 10. Thermal energy is recovered at the earth's surface primarily from the hot, high pressure water flowing upward between pipes 10 and 20, but may also be retrieved at the earth's surface from the turbine exhaust steam, if desired.

As described in the aforementioned Matthews U.S. Pat. No. 3,824,793, the hot, high pressure water within well casing 20 is fed by pipe 20a to a conventional surface thermal power plant 22, which latter may include in the usual manner a vapor generator system in which a major part of the energy in the hot geothermal fluid is converted into energy in high pressure vapor for driving an alternator supplying electrical energy on power lines 24. The cooled geothermal fluid is pumped by pump 31 back deep into the earth via re-injection well 32. Thus, the geothermal fluid flow loop is effectively completed and the fluid and its dissolved mineral salts are returned into deep strata of the earth.

Still referring to FIG. 1, a representative closed loop for injecting clean water into the deep well geothermal system will be described. The steam exhausted upwardly from the driving turbine at section 35 of that well is conveyed by pipes 10 and 10a to a heat exchanger element 7 of a conventional heat exchanger 8, and, after condensation therein, flows through the normally operating pressure pump 5. Heat exchanger 8 may be operated by supplying cooling water in a third loop including a conventional cooling tower (not shown) to pipe 6 connected through heat exchanger element 8 and output pipe 13 back to the same fluid cooling tower. Alternatively, known expedients may be employed for extraction of additional energy during the condensation process for use by power plant 22. The clean water condensate is pumped by the conventional pump 5 for re-injection into the deep well pipe 2 at a pressure substantially above that of the pumped hot well water. Replenishment of the clean water may be supplied from the normally inactive source 12.

As previously noted, the steam turbine driven-hot water pump system is to be suspended at the bottom of the well from a conduit such as the turbine exhaust steam pipe 10. The suspended apparatus includes sections 33 through 37 of the geothermal pump system. After the assembly of sections 33 through 37, the geothermal pump system is lowered into the well casing pipe 20, to its operating level by the gradual lowering of the steam exhaust pipe 10 as the latter is assembled. The clean water injection pipe 2 may be similarly introduced as the assembly is lowered and therefore also lowered into its operating position with the geothermal pump system using conventional oil well technology.

Before the geothermal pump system is put into its operating position, an annular seal system must be provided below the intake shroud 41 of the pump. In its operating location, the cooperating pump seal will translate axially with respect to the inner surface of casing 20 because of the effects of thermal expansion. The geothermal pump system, hanging as it does from a long pipe such as the steam exhaust pipe 10, may move up or down by many inches, so that a slippable seal interface is required between pump section 37 and the well pipe casing 20. The inner wall of the casing pipe 20 will normally be rough and will vary in diameter and roundness, so that a flexible sealing element is required.

According to the invention, and as seen generally in FIG. 2, the deep well sealing section 65 is supported from a generally conventional pump shroud 41 supported, in turn, from the pump section 37 by a plurality of welded radially spaced vanes 38. In this manner, an annular passageway provides smooth flow of the brine upward from the production pipe 54, through the expanding annulus between shroud 41 and the rotary pump cone 40, and upward toward the earth's surface within well casing 20.

The production pipe 54 also serves as a mounting device for a system of one or more annular cup-shaped piston seal devices 50. As is seen in FIG. 2, where the device 50 is represented in operation position, each seal system includes a tubular metal collar piece 55 affixed to a portion of the outer wall of production pipe 54. At its bottom, collar piece 55 has an apertured metal disk 59 supporting, in turn, at its periphery a short cylindrical metal flange 58. Elements 55, 58, and 59 may be formed integrally of corrosion resistant alloy and they constitute a support for the resilient or flexible element of seal 50.

The cup-shaped seal devices 50 are composed of a molded flexible material adapted to withstand the severe thermal and caustic nature of the environment in which they are to be used. There is available in the market a variety of materials for the construction of molded seals and other bodies for use in the oil fields and in other such severe environments, including various well known elastomer compositions. For relatively low temperature wells, certain ethylene-propylene compositions widely used in industry are suitable. For general and high temperature use, a molded composite of asbestos fibers and solid polymerized fluorocarbon resin materials is found useful. Other suitable compositions known to those skilled in the art are additionally selectable according to the character or the well.

In general, each annular seal device 50 may include an annular mounting base part 60 bonded to apertured plate 59 at interface 61 and to the inner surface of annular flange 58 at interface 57. Extending upwardly from base part 60 is an elastic cup-shaped element 56 forming a slidable seal at interface 52 between its outer surface and the inner surface of casing 20. It is seen in FIG. 2 that at least one metal loop 53 protrudes from the inner surface of seal device 50; a circular array of many such loops will normally be used, as will be further explained. Only one such loop 53 of the array for seal device 50 is shown in FIG. 2 for the convenience of providing an uncluttered drawing, since the loop 53 in the situation of FIG. 2 is in its purely passive state, seal device 50 having been deployed against casing 20. Abutting at interface 51' is a second seal device 50' having elements 51' to 61' corresponding to elements 51 to 61 of seal device 50. Two or more such seals, as needed, may be affixed in serial fashion to production pipe 54.

Figure 3:
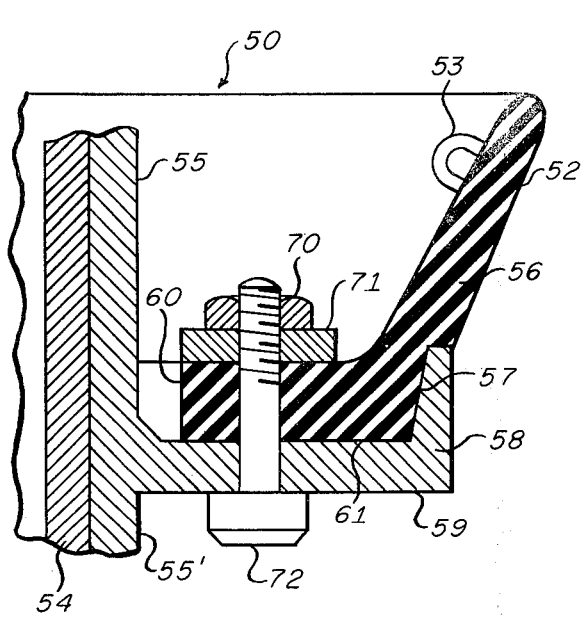
FIGS. 3, 4, and 5 are fragmentary views in cross section showing the seal arrangement in three successive states and apparatus for deploying the seal.
Figure 4:
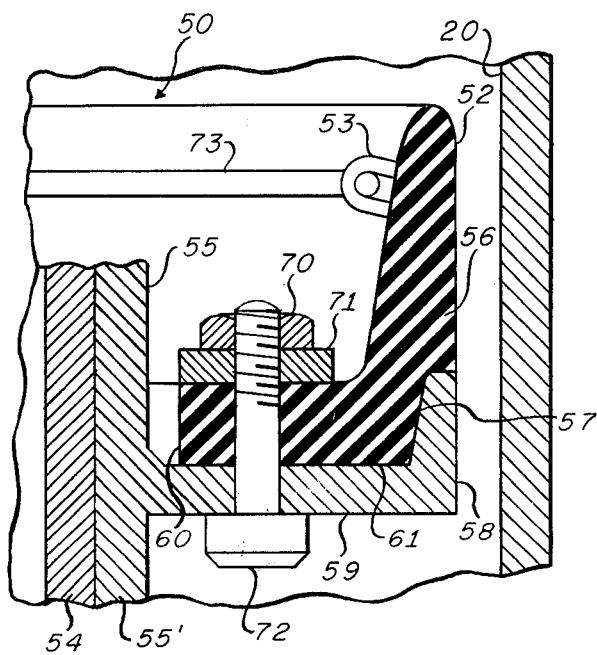
Figure 5:
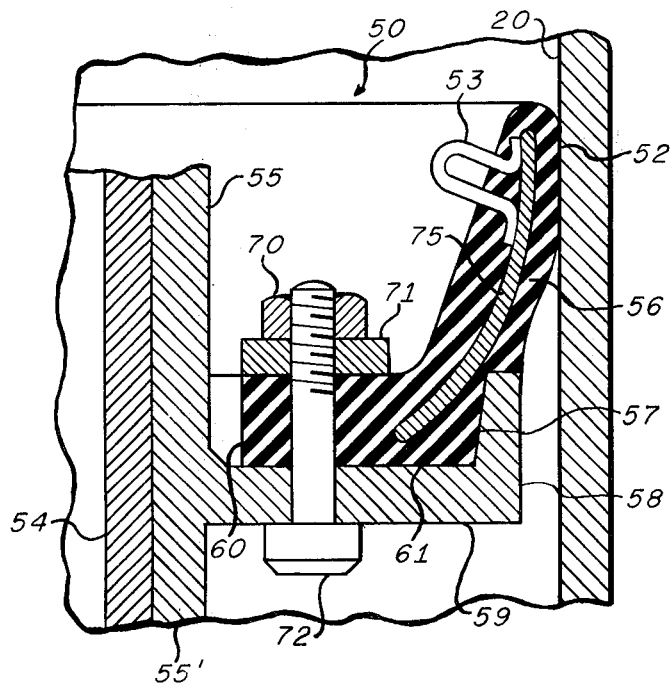

FIGS. 3, 4, and 5 illustrate a form of the seal device 50 in successive stages of use. In FIG. 3, the annular piston shaped seal device 50 is seen mounted with respect to production pipe 54, as before, on elements 55, 58, and 59, this time being held in position by a conventional fastener, such as a bolt 72 running through aligned clearance holes in plate 59, base part 60, and a washer or plate 71, and correperating with a nut 70. The piston seal device 50 has been mounted on the geothermal pump preparatory to inserting the latter into its well. Such is indicated by the presence in the view of the production pipe 54, the well casing 20 being absent. To prepare each seal device 50 for lowering into the well, further apparatus shown in FIGS. 5 and 6 is used, it being understood that FIG. 6 is a developed or "unrolled" view of FIG. 4.

Figure 6:
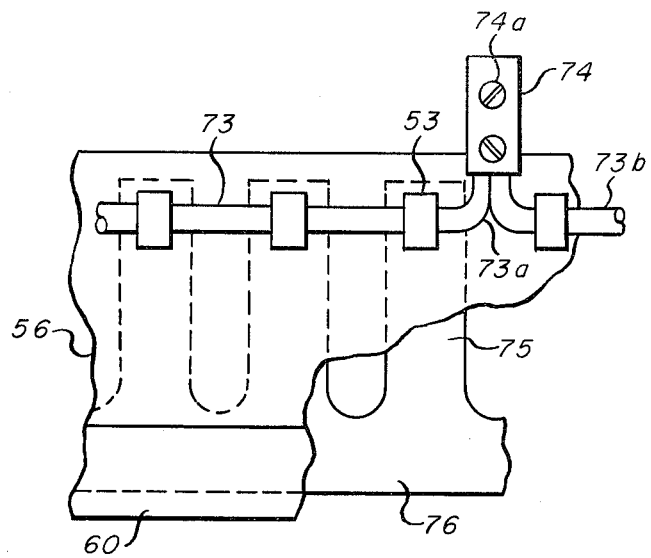
FIG. 6 is a partial development, partly in cross section, of the seal when in the state shown in FIG. 4.

In FIGS. 4 and 6, the use of a tie back cable, cord, tape, rope, or other flexible connector 73 is shown, element 73 being passed through each of the plurality of loops 53, as a tension means to pull the mating surface 52 inward to a stowed or retracted position so that it may avoid contact with and abrasion by the inner surface of casing 20 while the pump is being lowered into the well. The flexible connector element 73 of the tension means having been passed through all loops 53, its ends 73a, 73b are pulled together and tied. The reshaped seal device 50 will then be distorted to have a diminished diameter substantially the same, for example, as that of annular flange 58 and is thus protected from damage by casing 20. The apparatus as seen in FIG. 4, including the geothermal pump, may then be safely lowered to its operating position in the geothermal well by pipe 2 or 10. In place of tying the ends of cable or rope 73, its ends 73a, 73b may be held under tension in a suitable clamp indicated at 74.

Tie-back or flexible connector element 73 pulls inwardly against the flexible wall portion 56 of seal 50, whose spring characteristics may be augmented as shown in FIG. 6 by the inclusion within the body of the wall 56 of a comb-like structure comprising a flexible metal sheet with a base 76 and a plurality of spaced spring fingers 75. The metal base 76 is seen to extend into the inert base part of the flexible seal 50. As further illustrated in FIG. 5, each flexible finger 75 forms a convenient element to which a corresponding tie-back loop 53 may be fastened. Thus, the spring-like nature of the seals is enhanced and a convenient way of attaching the tie-back connector loops 53 is afforded.

The state of the seal device 50 in its operating position deep in the well is illustrated in FIG. 5, which figure also contributes in an apparent manner to a visual understanding of the function and disposition of the spring fingers 75 at that time. In FIG. 5, the seal has been deployed, rope 73 having been removed, and the flexible sealing face 52 is now firmly held against the interior surface of well casing 20 in part by spring fingers 75.

Before use, the geothermal pump and its seal section 65 are lowered into the well to the pump's operating station with the seals retracted, as in FIG. 4, by a flexible connector or tie-back element 73 providing tension means. In this manner, the seals 50, 50' reach their operating site without abrasion by rubbing against the inner surface of casing 20 and without other damage due to local roughness of that inner surface. At the operating location, hot brine fills the production pipe 54 and also fills the annular cavities in which the elastic seals 50, 50' are located. The tie-back or flexible connector element of the tension means is thus immersed in the hot caustic brine.

So that the seal cups 50, 50' may then be deployed, the flexible tie-back connector 73 may be composed of a material that will stretch, relax, dissolve, or otherwise disintegrate within a reasonable time period in the hot caustic brine. The disintegration process employed may be the consequence of any of several known physical or chemical interactions between the material of the tie-back element or tension means and the hot brine, or combinations thereof. Since the geothermal pump can be lowered to its operational position in a matter of an hour or so, and since ten or so hours are then required to prepare cooperating equipment at the earth's surface before the geothermal pump is turned on, it is reasonable to use a tie-back or flexible connector element 73 which will require several hours to relax or dissolve and thus finally to deploy the seals 50, 50' into their operating positions against the inner surface of casing 20.

It will be apparent that the flexible connector element 73 may be composed of a water soluble elastomeric tape or cord. It may be constructed in a conventional manner of many short fibers such as paper or asbestos fibers or bonded together in the form of a cord or rope by a water soluble adhesive, such as water glass, a polyvinal alcohol, polyethylene glycol, or ethyl-methyl cellulose or hydroxy cellulose, for example. Alternatively, the tie-back element 73 may be a conventional cable or cord immune to the brine and the clamp 74 of FIG. 6 may be made of a hot-brine soluble or otherwise disintegratable material whose strength will degenerate due to heat or to the caustic nature of the geothermal brine. The clamping element 74 may itself consist, for instance, of two parts clamped together about the ends of cable 73 by screws 74a, the two parts being constructed of a low melting alloy. Other such clamping configurations constructed to release tie-back 73 by melting will be readily envisioned by those skilled in the art. An abundance of ternary and binary alloys fusible in the range of 200° to 400° F, for instance, is available for use in clamp 74 or as parts of cable 73.

Figure 7:
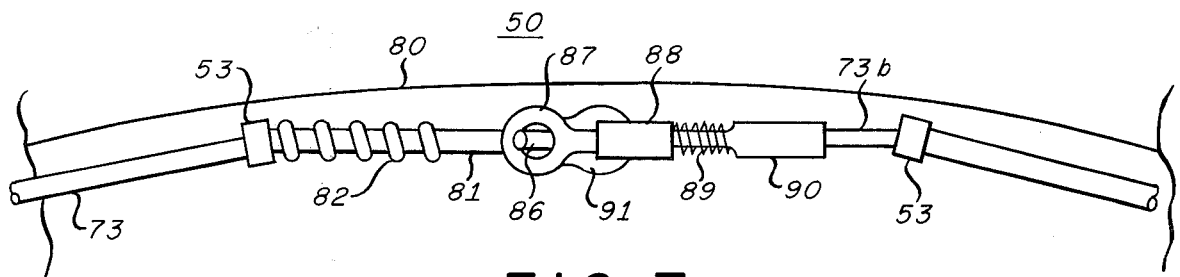
FIG. 7 is a partial plan view of an alternative arrangement for deploying the seal.
Figure 8:
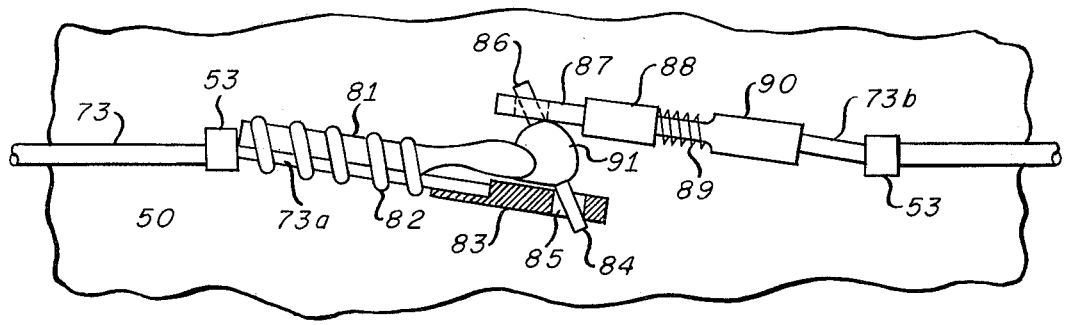
FIG. 8 is a partial elevation view, partly in cross section, of the structure shown in FIG. 7.

An alternative system for release of the seal 50 is shown in FIGS. 7 and 8. In this arrangement, a permanent metal cable 73 is drawn through the loops 53 at the inner surface 80 of seal element 50. The cable end 73b is equipped with an element 90 swaged to cable end 73b and fitted with a threaded portion 89 mating with interior threads within a bore in the eye piece 88. An eye 87 is integral with piece 88. The effective length of cable 73 is adjusted at the time of its installation by manually rotating parts 88, 89 with one respect to the other.

To the cable end 73a is swaged a plate 83 having a hole 85. There is also supplied a trip lever 81 having an enlarged, generally spherical end 91 that is provided with oppositely extending pins 84, 86. In the condition in which the seal system is ready to be lowered into the well, pin 86 projects as shown in FIG. 8 through the hole in eye 87, while pin 84 projects through hole 85 in the cable end plate 83. In that condition, the end of trip lever 81 opposite sphere 91 lies along side of cable end 73a and is bound thereto by a soluble or otherwise disintegratable binding or cord 82. When the geothermal system is lowered into the well, binding 82 is destroyed or relaxed, and the forces provided in part by the spring fingers 75 of FIGS. 5 and 6 pull the trip lever, rotating it about hole 85. Consequently, eye 87 slips off of pin 86, releasing the seals so that they expand and make the desired sealing contact with the inner wall of casing 20.

Accordingly, it is seen that the invention is a significant improvement over the prior art, facilitating the ready and inexpensive installation and reliable operation of geothermal systems; according to the invention, there is provided means for the support of a deep well geothermal pump system within the well casing from the earth's surface by the pump-driving turbine exhaust or other conduit. In view of the differential expansion effects on the relative lengths of the casing pipe extending downward from the earth's surface and the exhaust or other conduit contained therein, an improved flexible seal is provided between the suspended geothermal pump system and the well casing. The seal is made a part of the pump before the latter is lowered into the well. Protective elements prevent damage to the seal during the latter event. The seal is automatically deployed upon the pump reaching its operating site. The geothermal pump system may be subsequently removed from the well without concern for consequent damage to the seal, since the flexible seal elements may themselves readily be replaced at the earth's surface at nominal cost. No time or money must be expended for the introduction or removal of a conventional packer.

It will be understood by those skilled in the art that the invention is readily adaptable to use in other types of geothermal energy extraction systems. For example, it finds utility in the improved geothermal well pumping system shown in the H. B. Matthews, K. E. Nichols, U.S. Pat. No. 3,910,050 for "Geothermal Energy System and Control Apparatus," issued Oct. 7, 1975 and assigned to Sperry Rand Corporation, and elsewhere. It may additionally be employed, for example, in the gravity head type of geothermal system that is the subject of the H. B. Matthews U.S. patent application Ser. No. 674,243 for a "Geothermal Energy Conversion System," filed Apr. 6, 1976 and also assigned to Sperry Rand Corporation.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. In geothermal deep well pump apparatus of the kind including deep well pump means having input means for pumping a first fluid always in liquid state through well casing means in cooperative energy exchanging relation with respect to a second fluid for producing a working fluid:
   turbine means at said deep well pump means for driving said deep well pump means in response to said working fluid,
   first conduit means for passage of said working fluid between said turbine means and the earth's surface, said turbine means being suspended within said deep well by said first conduit means,
   second conduit means affixed to said input means and extending downward therefrom,
   resilient seal means disposed around said second conduit means normally in contacting sliding relation with said well casing means, and tension means for retracting said resilient seal means from contact with said well casing means while said turbine means, said deep well pump means, and said resilient seal means are being lowered upon installation into said geothermal deep well.

2. Apparatus as described in claim 1 wherein said tension means is adapted to release said resilient seal means under at least one influence of said first fluid when immersed therein.

3. Apparatus as described in claim 2 wherein at least a portion of said tension means is composed of a material soluble in said first fluid when immersed therein.

4. Apparatus as described in claim 2 wherein at least a portion of said tension means is composed of a material fusible in said first liquid when immersed therein.

5. Apparatus as described in claim 2 wherein at least a portion of said tension means comprises fiberous elements bonded together by a material soluble in said first fluid when immersed therein.

6. Apparatus as described in claim 2 wherein:
said resilient seal means has an annular inner portion affixed to said second conduit means, and
said resilient seal means has an annular upwardly extending outer generally cylindrical portion having an outer face for contacting said well casing means and an inner face.

7. Apparatus as described in claim 6 wherein said inner face has extending therefrom loop means for coupling to said tension means.

8. Apparatus as described in claim 7 wherein said tension means comprises flexible connector means adapted to disintegrate under at least one influence of said first fluid.

9. Apparatus as again described in claim 7 wherein said tension means comprises flexible connector means substantially immune to said first fluid and held in tension by clamp means adapted to disintegrate under at least one influence of said first fluid.

10. The method of installing geothermal fluid pumping apparatus at an operating location within the casing of a geothermal well, said fluid pumping apparatus comprising turbine motor means, turbine working fluid conduit means extending from said turbine means to the earth's surface and supporting said turbine means, pump means driven by said turbine motor means, resilient seal means at the inlet of said pump means for normally contacting in sliding relation at the operating location of said fluid pumping apparatus the inner surface of said casing, including the steps of:
mounting said resilient seal means at said inlet of said pump means,
applying tension to said resilient seal means to retract it to a stowed position from its normal contacting position by employing tension means adapted to release said resilient seal means under at least one influence of said geothermal fluid when immersed therein,
lowering said fluid pumping apparatus into said well by said working fluid conduit means, whereby said tension means becomes immersed in said geothermal fluid, thereupon releasing said resilient seal means from its stowed position into its normal contacting, sliding relation with the inner surface of said casing.

* * * * *